(12) United States Patent  
Edwards et al.

(10) Patent No.: US 7,324,110 B2  
(45) Date of Patent: Jan. 29, 2008

(54) METHOD AND SYSTEM FOR CLEANING MOTION CAPTURE DATA

(75) Inventors: Gareth Edwards, Kerridge (GB); Kevin Walker, Sheffield (GB); Jane Haslam, High Peak (GB)

(73) Assignee: Image Metrics Limited (GB)

( * ) Notice: Subject to any disclaimer, the term of this patent is extended or adjusted under 35 U.S.C. 154(b) by 39 days.

(21) Appl. No.: 11/292,423

(22) Filed: Dec. 2, 2005

(65) Prior Publication Data

US 2006/0126928 A1    Jun. 15, 2006

Related U.S. Application Data

(60) Provisional application No. 60/634,488, filed on Dec. 9, 2004.

(51) Int. Cl.  
    *G06T 15/00* (2006.01)
(52) U.S. Cl. .................. 345/473; 345/475; 382/106
(58) Field of Classification Search ............... 345/473, 345/474, 475, 420; 382/106, 286  
See application file for complete search history.

(56) References Cited

U.S. PATENT DOCUMENTS 6,492,986 B1 *   12/2002   Metaxas et al. ............ 345/420

7,116,330 B2 *   10/2006   Marshall et al. ............ 345/474

OTHER PUBLICATIONS

Herda et al. "*Skeleton-based motion capture for robust reconstruction of human motion*", Computer Animation 2000, Proceedings, pp. 77-83, May 2000.  
I-Chen et al. "*Extracting 3D facial animation parameters from multiview video clips*", IEEE Computer Graphics and Applications, vol. 22, No. 6, pp. 72-80, Nov. 2002.  
Heap et al. "*Towards 3D hand tracking using a deformable model*", IEEE Computer Society, pp. 140-145, Oct. 1996.  
Grung et al. "*Missing values in principal component analysis*", Chemometrics and Intelligent Laboratory Systems, vol. 42, No. 1-2, pp. 125-139, Aug. 1998.

* cited by examiner

*Primary Examiner*—Phu K. Nguyen  
(74) *Attorney, Agent, or Firm*—Bromberg & Sunstein LLP

(57) ABSTRACT

A system and method for cleaning a set of motion capture data, wherein the data correspond to a set of point coordinates relating to a model but may include missing or inaccurate values. A subset of the motion capture data is identified that corresponds to valid points matching locations of corresponding points of the model, and a best set of model parameters is computed in such a manner as to minimize a norm of the valid points with respect to the model. A complete set of point coordinates is then predicted based on the best set of model parameters and a subsequent set of cleaned motion capture data. Actual points are inserted where validated, and the process is iterated until a specified criterion is met.

11 Claims, 7 Drawing Sheets

METHOD AND SYSTEM FOR CLEANING MOTION CAPTURE DATA

The present application claims priority from U.S. Provisional Patent Application 60/634,488, filed Dec. 9, 2004, which is incorporated herein by reference.

TECHNICAL FIELD

The present invention relates generally to computer aided animation, and more particularly, to methods in the production of animation that captures the performance of an actor, human or otherwise.

BACKGROUND ART

Motion capture systems are used in the production of animation to capture the performance of an actor by recording the 3-dimensional (hereinafter, '3D') location of a set of markers placed on the actor, either physically or by software association with identifiable features of the actor's physiognomy.

Motion capture (or, "mocap") systems use a variety of physical techniques to record the location of the markers, but the output of every system is similar: a set of 3D positions in space for every 'frame' captured. For example, a motion capture system might be set up to record the position of 200 key markers on an actor at 30 frames-per-second. This means that a set of 200 3D coordinates is returned by the system 30 times each second.

Usually, the 3D data are passed into some animation software and the movement of the data is translated to the movement of a synthetic character (the animated character).

Motion capture data typically require cleaning both because of measurement inaccuracy and because of the absence or unreliability of data when markers are unobservable due to the orientation of the subject or masking by another object in the frame. However, the effort required to clean motion capture data may be as extensive, in some cases, as the effort to create animation from scratch.

The 'raw' data returned by motion capture systems is often corrupted. The data can be both 'noisy' and 'incomplete'. To cite one example, a motion capture system may be used to track markers attached to an actors face. Errors and inaccuracy in the physical system dictate that there will typically be inaccuracy in the returned 3D location of each points. Over the sequence, the returned data points may appear to 'jitter' due to measurement inaccuracy. On some occasions, the coordinates of a 3D location for a particular point may be missing entirely from a frame.

On other occasions an even bigger problem can occur: the markers on the actor may be unreadable (for example, a prop, say a mug, comes between the markers and the capture system). Under these circumstances, the 3D locations of a significant number of points may be missing from one or more frames.

Ideally, a motion capture would return a set of 3D points for every point on the actor, for every frame. However, in reality, at each frame there are often one or more missing points, which make the data difficult to use by animators. Moreover, even when data points are present, there may be significant error in the values returned describing their 3D position.

It is thus desirable that a method be provided for robust and efficient cleaning of mocap data.

SUMMARY OF THE INVENTION

In accordance with preferred embodiments of the present invention, a method is provided for cleaning a set of motion capture data stored as at least one image on a digital computer and further pertaining to an object of a specified class. The data to be cleaned correspond to a set of point coordinates relating to a model characterized by a set of model parameters. The method has steps of:
  a. identifying a subset of the motion capture data corresponding to valid points matching locations of corresponding points of the model;
  b. computing a best set of model parameters to minimize a norm of the valid points with respect to the model; and
  c. predicting a complete set of predicted point coordinates based on the best set of model parameters so as to form a subsequent set of cleaned motion capture data.

In accordance with alternate embodiments of the invention, a subset of the predicted point coordinates may then be replaced with known valid values. In further embodiments, the subsequent set of cleaned motion data according to step (c) may then be used as the subset of motion capture data of step (a), and steps (a), (b), and (c) may be iterated until a specified criterion is met. The criterion may be a bound on a norm characterizing the distance between the subsequent set of cleaned motion data according to step (c) and the subset of motion capture data of step (a), or it may be a specified number of iterations.

In accordance with yet further embodiments of the invention, there may be a predecessor step of creating the model from a training set of plausible shapes and shape variations of the class of the object. The model may comprise an average shape of a subject and a set of functions describing deviations from the average shape characterized by the model parameters.

In accordance with other aspects of the present invention, a computer program product for use on a computer system is provided for cleaning a set of motion capture data. Computer readable program code is provided that has:
  a. program code for identifying a subset of the motion capture data corresponding to valid points matching locations of corresponding points of the model;
  b. program code for computing a best set of model parameters to minimize a norm of the valid points with respect to the model; and
  c. program code for predicting a complete set of predicted point coordinates based on the best set of model parameters so as to form a subsequent set of cleaned motion capture data.

BRIEF DESCRIPTION OF THE DRAWINGS

The foregoing features of the invention will be more readily understood by reference to the following detailed description, taken with reference to the accompanying drawings, in which.

DETAILED DESCRIPTION OF SPECIFIC EMBODIMENTS

As used herein, and in any appended claims, the term 'cleaning' of data refers to addressing either or both of two classes of problems encountered in the processing of motion capture data files: the first is that of missing data—data corresponding to the location of some subset of identified marker positions that may not be obtained because the markers are missing from particular frames due to the way an actor's face is facing, or because a feature is blocked by a prop, etc. The second class of problems addressed by cleaning is that of data quality due, for example, to measurement inaccuracies.

In accordance with preferred embodiments of the present invention, input 3D tracking data is processed so as to return 'clean' 3D tracking data; i.e., data with substantially no missing 3D coordinates for any frame. The present invention is applicable to mocap data, without regard to the motion capture process itself. Implemented as computer software, embodiments of the invention take blocks of 3D data points, which typically contain errors and incompleteness, and returns 'clean' blocks with reduced errors and no incompleteness, thereby much more usable by animators.

The invention as applied to data on the basis of a 'model' which is applied to the input data. As used herein and in any appended claims, the term 'model,' generally, refers to any mathematical description that provides for parametrization of the position and/or motion of a subject or its component parts. The application of the methods described herein to any model of motion capture data is within the scope of the present invention as claimed.

In particular, the invention will be described with reference to a class of models wherein the model represents the average relative positions of a specified set of 3D marker positions for the object of interest, for example, the human face, along with a mathematical description of the way these relative positions vary in normal circumstances (in this example due to change of facial expression or talking, etc.)

Figure 1A:
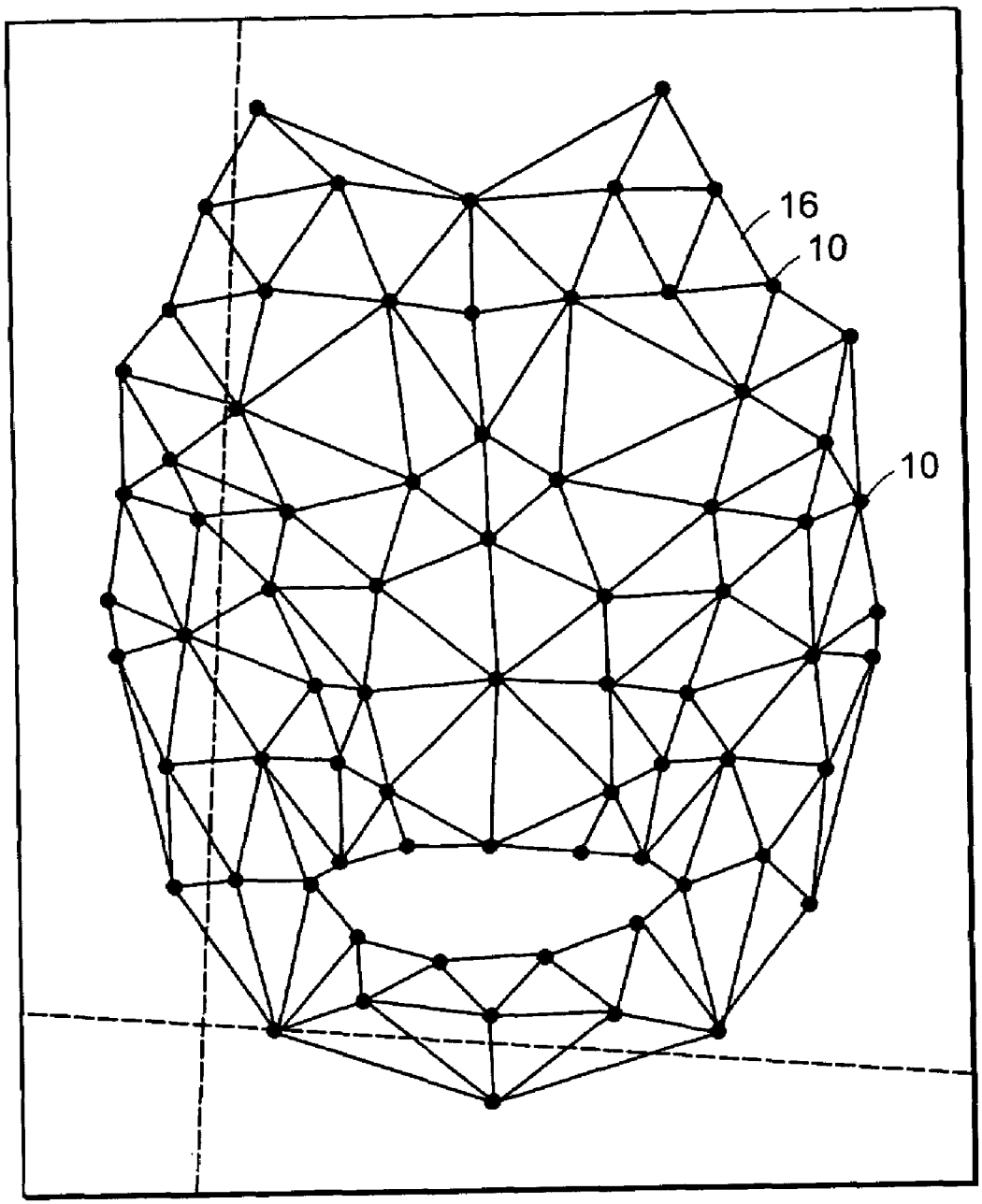
FIG. 1a depicts a typical frame of mocap data, while FIG. 1b includes a subject with markers indicated.
Figure 1B:
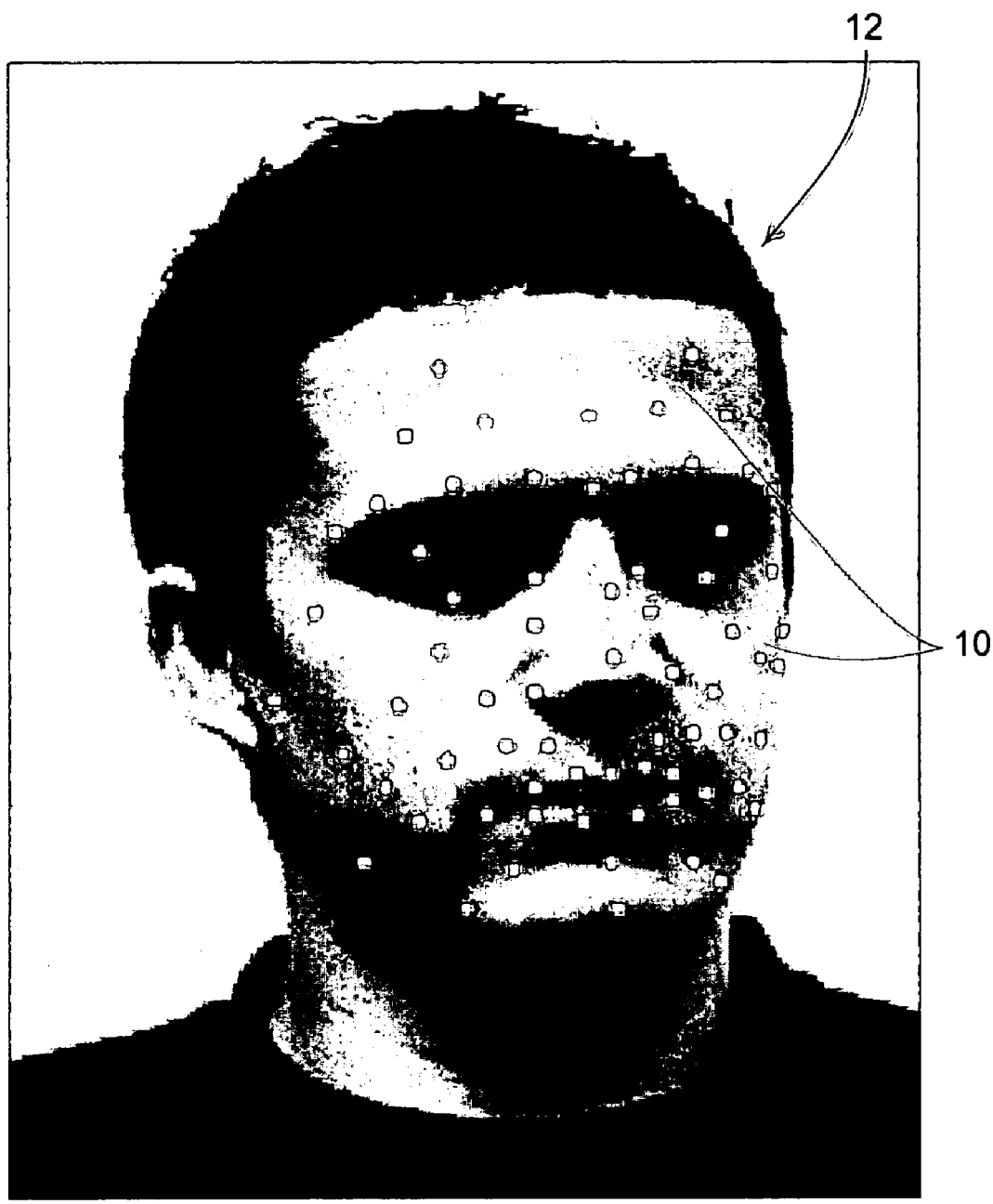

A typical frame of mocap data is depicted in FIG. 1a. Individual markers 10 characterize loci associated with subject 12, which, in the instance discussed, is a human actor, as shown in FIG. 1b. Each marker 10 corresponds to an identified feature, which moves as the subject displays facial expression or moves in space. However, the placement of particular markers for optimal tracking of subject features is not within the scope of the present invention, as the present invention applies to any formulation of a model for mocap data. The position, in three dimensions, of each marker 10 may be depicted on a frame 14, with segments 16 connecting adjacent markers as a matter of representational convenience.

Figure 2:
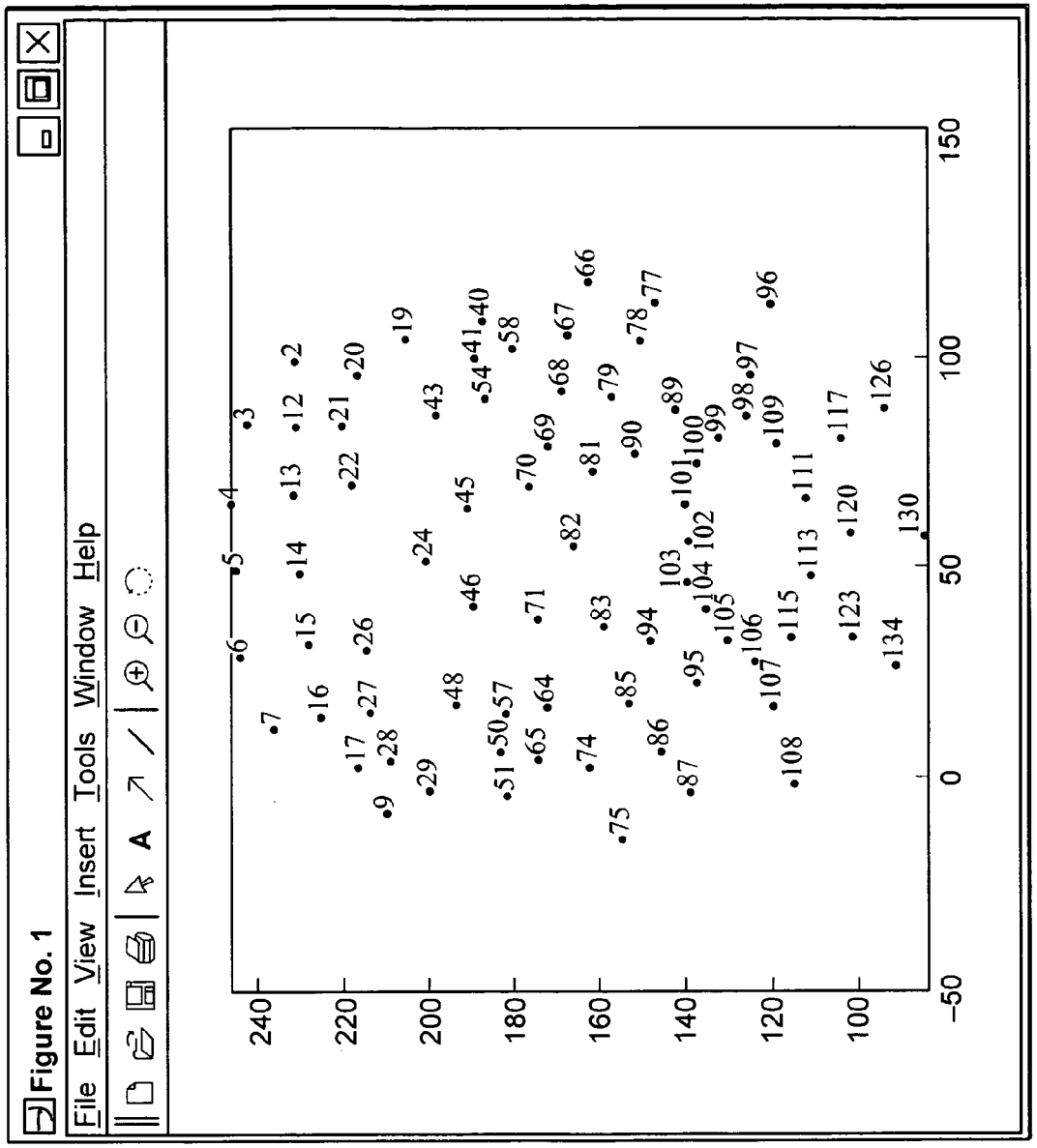
FIG. 2 is a screenshot showing a model of representative marker positions.

Slices of the model, in planes specified by the user, may be represented as shown in FIG. 2, with each numeral uniquely representing a marker position.

Practice of the present invention is posited upon the existence of a mathematical model of 'plausible' shapes and shape variation, and then a method for applying the model to incomplete data to predict the location of the missing data. The methods are not specific to any particular placement of the marker set, and are shown, purely by way of example, and without limitation, as a set of markers placed on a human actor's face and subsequently tracked by a motion capture system.

For a particular object, in this case a face, a mathematical model of the plausible positions of markers may be built using 'clean' training data, as now described. A set of training 3D data blocks, known to have no missing data, are taken from a motion capture system. These data may have been perfectly clean in its raw form or may have been 'cleaned' by some other process (for example, manual adjustment) prior to the process of model building. The training data may consist either of data derived from a plurality of different actors or it can consist of footage of one particular actor. In the latter case, the model derived in that manner is typically applied only to further capture data of that particular actor.

Figure 3:
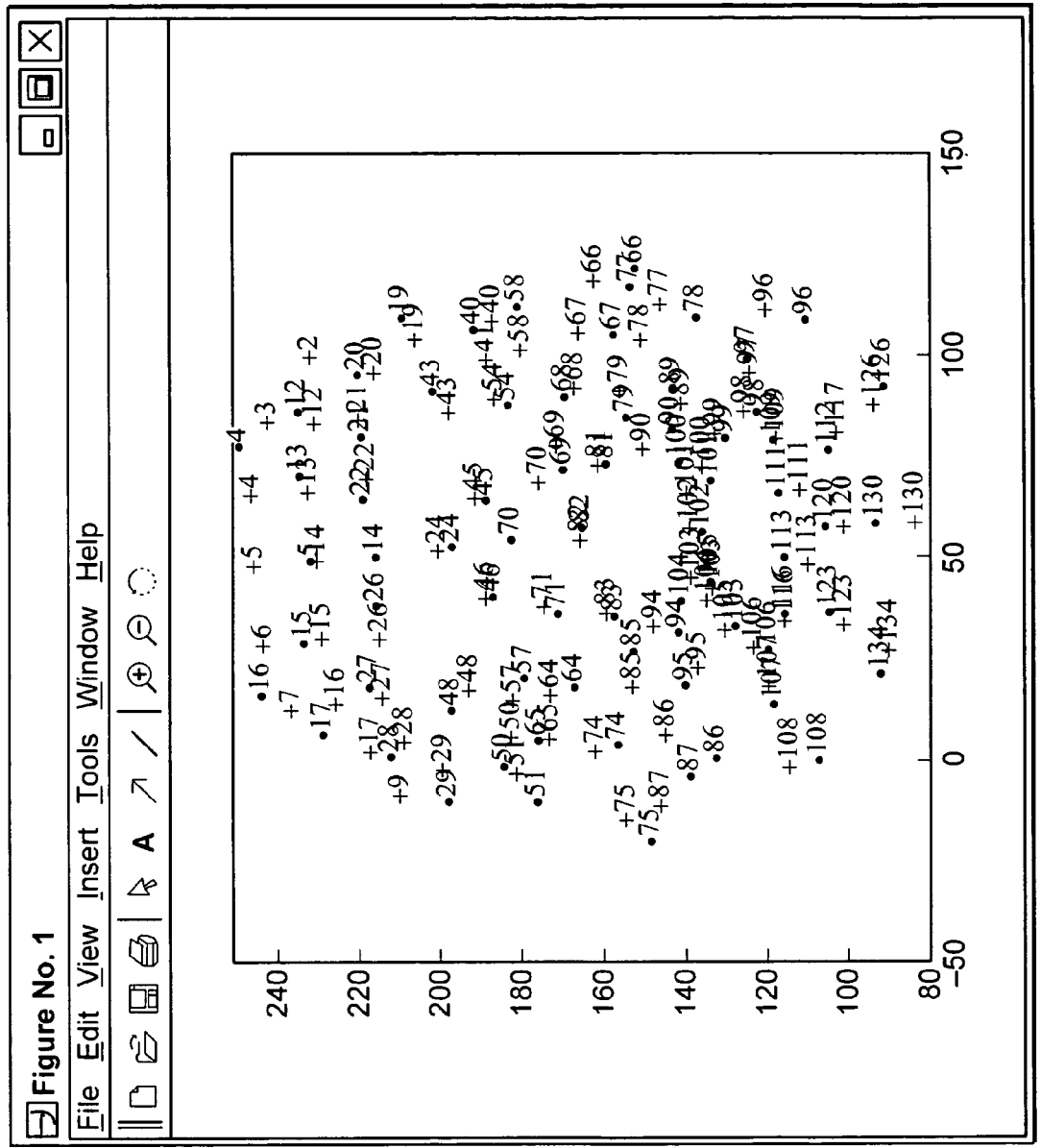
FIG. 3 shows a set of captured data points aligned to the reference frame of the model.

For the purpose of building a model, the relative positions of the 3D markers are consequential rather than their 'absolute' space-referenced positions. Thus, in building the model, the first step is typically to align each frame of 3D data to a common reference frame, as may be achieved by using one of various standard 3D alignment techniques, such as by 'Procrustes Analysis', which is described by Horn, "Closed form solution of absolute orientation using unit quaternions", *J. Optical Society*, vol. A 4, pp. 629-42 (April, 1987), which is incorporated herein by reference. A Euclidean alignment of a set of points (indicated by cruciate symbols) from a single mocap frame to the frame of reference of the model (with points indicated by dots) is depicted in FIG. 3.

The model provides for a compact mathematical description of the variation in relative 3D marker positions among frames of the clean training data. Once the data are aligned, this can be done by one or more of several types of statistical modeling techniques, including, for example, 'Principal Component Analysis' as described by Johnson and Wichern, in *Applied Multivariate Statistical Analysis*, pp. 458-513 ($5^{th}$ Edition, 2002).

In one set of embodiments, the model may consist of an 'average' shape for the 3D data along with a set of mathematical functions which describe how the shapes can change. By feeding a vector of control numbers or 'model parameters' into the mathematical functions any plausible set of 3D point coordinates can be generated. While the model parameters may span a space of model shape excursions, such is not necessarily the case for practice of the invention as claimed. Moreover, the model may be linear, in the sense in which motions correspond to linear combinations of points moving along straight lines (rather than, for example, arcs or curves). Such models are applicable to facial mocap (of humans or otherwise). However, the invention is not limited in its applicability to such models.

Figure 4:
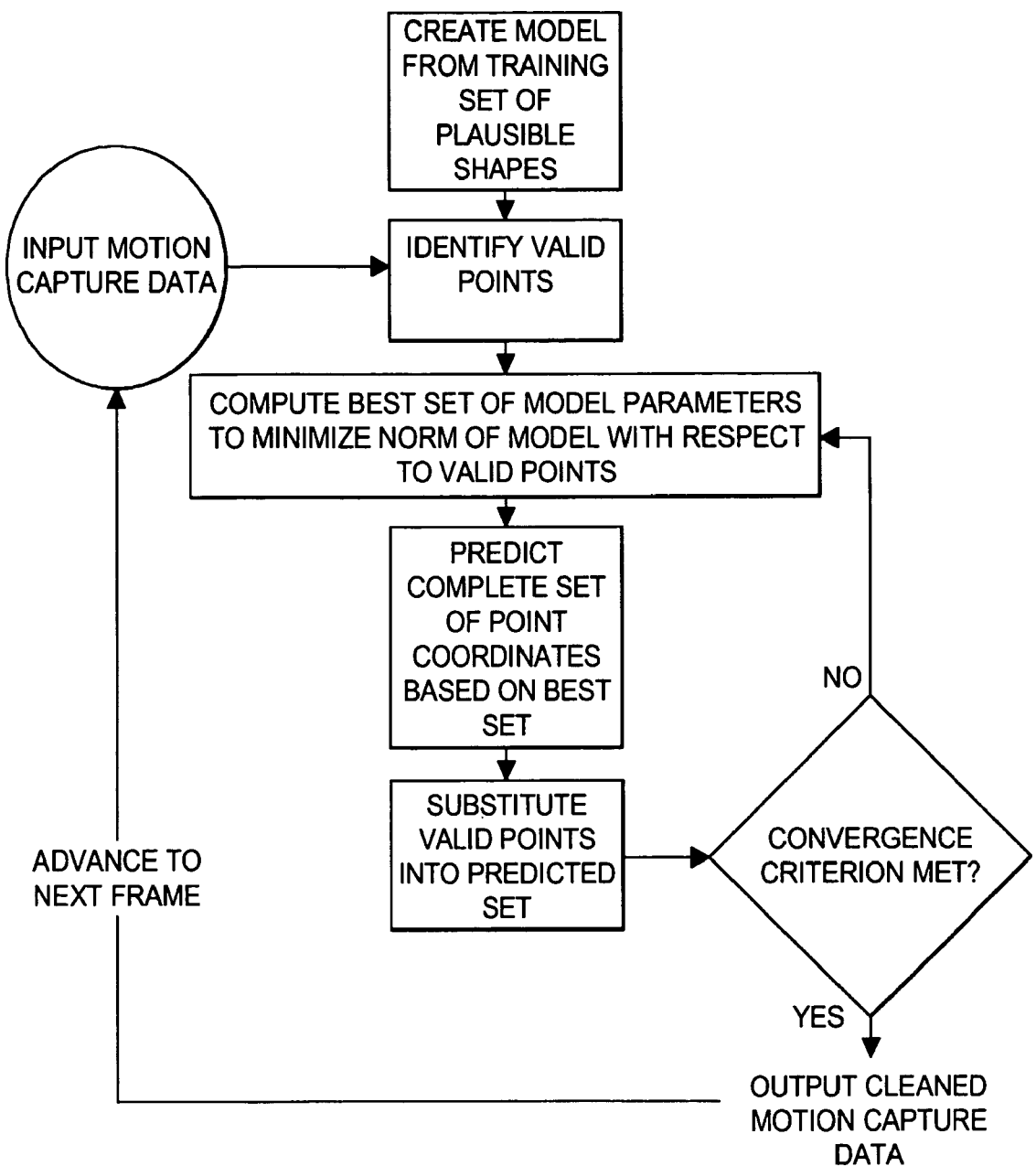
FIG. 4 is a flowchart of a mocap cleaning algorithm in accordance with embodiments of the present invention.

As will now be discussed with reference to the flow diagram of FIG. 4, embodiments of the present invention use the model, once trained as heretofore described, to predict the locations of the 3D point coordinates, missing from an incomplete set of input mocap data, to return a complete and 'clean' set of coordinates.

Figure 5:
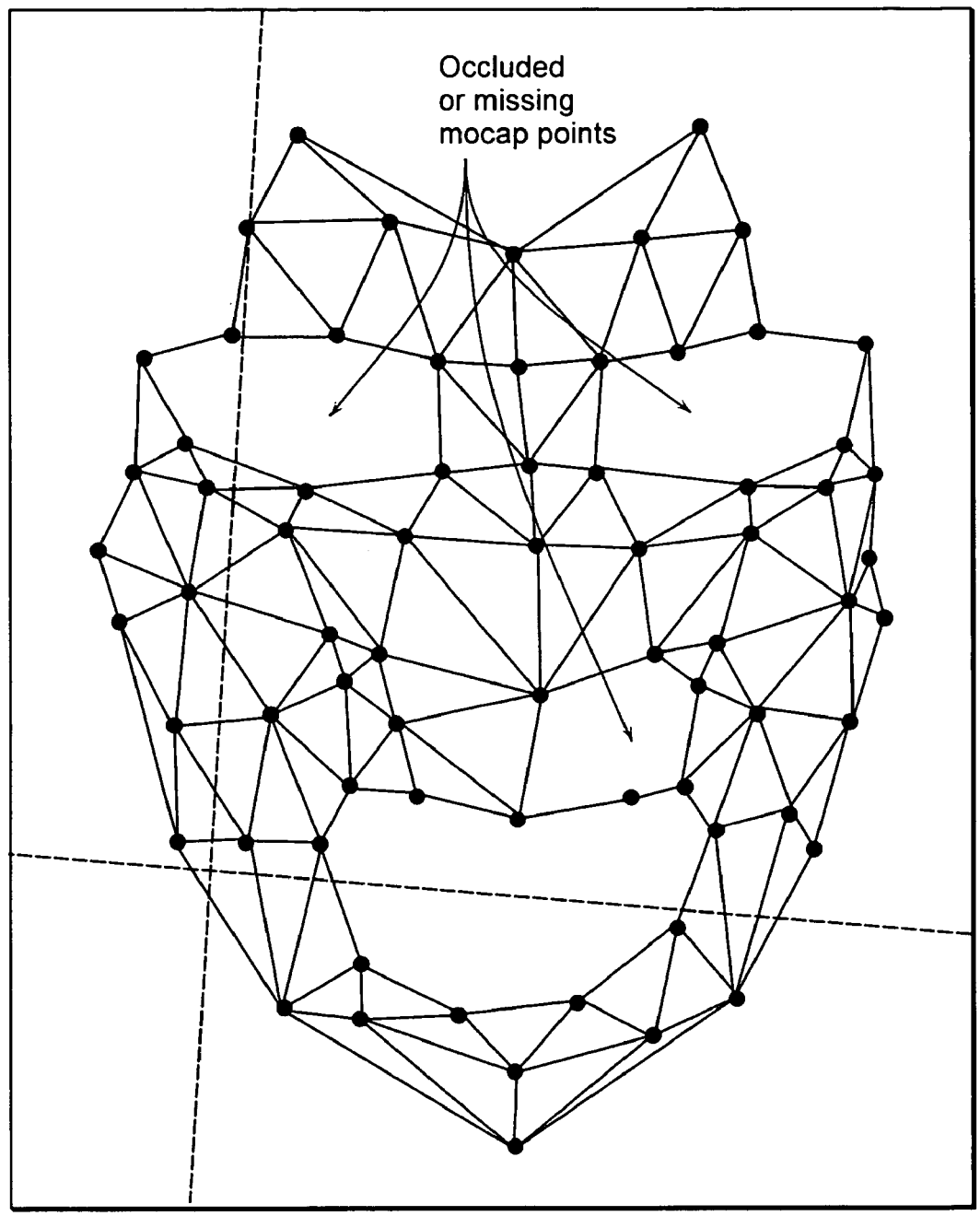
FIG. 5 is an example of a frame in which certain point coordinates corresponding to a subject face are obscured.
Figure 6:
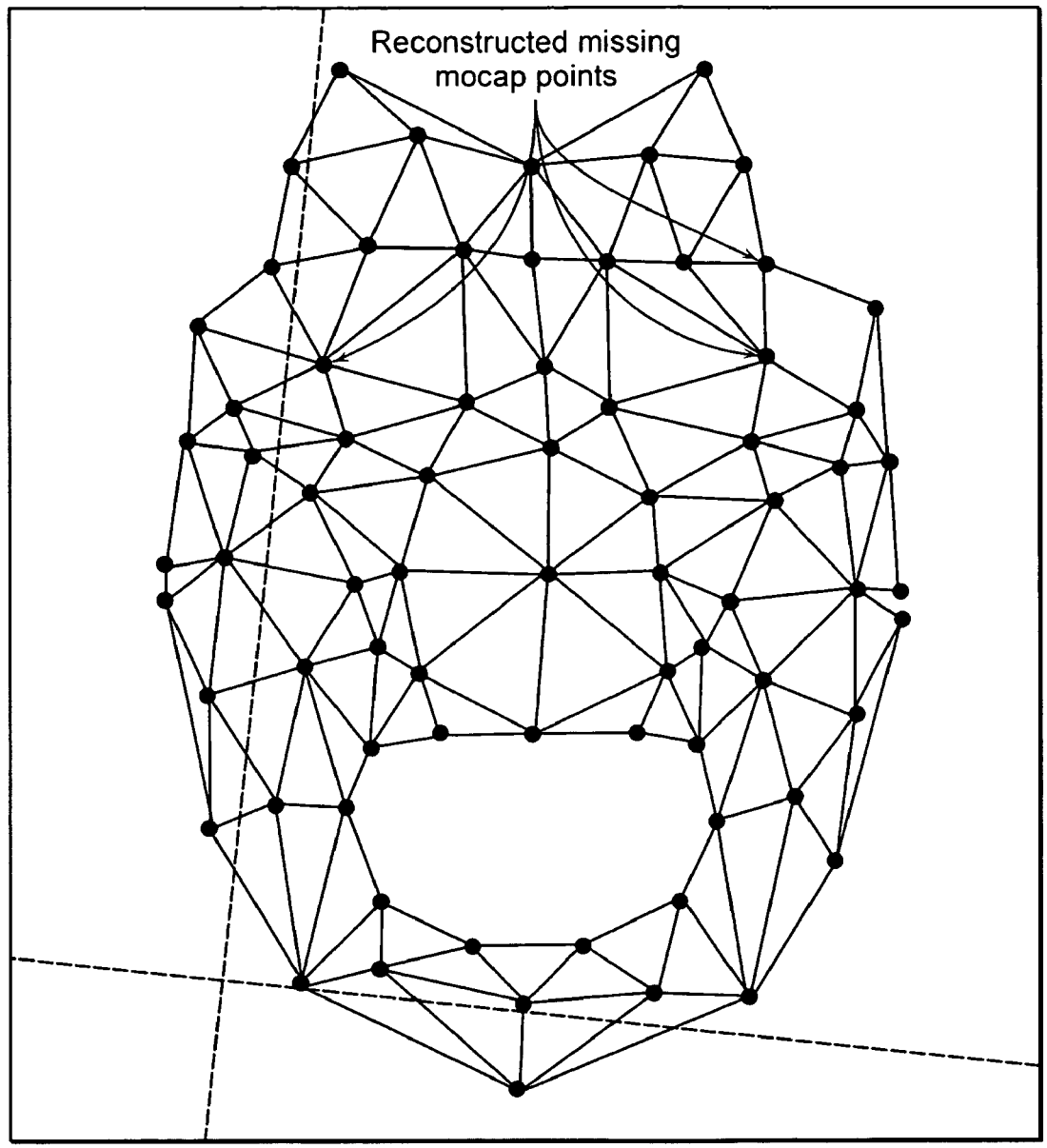
FIG. 6 shows a reconstruction of the subject face by application of an embodiment of the present invention.

The input to the cleaning process is a set of 3D point coordinates for frame of data from a motion capture system. The input data may have missing point locations, as shown in FIG. 5, thereby representing only a partial set of points when compared to the model. For example, in a facial capture situation, if the actor was drinking from a mug, a number of points around the mouth may have been invisible to the motion capture hardware and thus missing from the input data.

In accordance with preferred embodiments of the invention, valid input point locations are identified, based upon their positioning within 'distances' of neighboring points that the model recognizes as 'reasonable.' The term 'distance', as used herein and in any appended claims refers to a norm with respect to the parametrized variables of the model, and may correspond to a Euclidean norm, but need not, within the scope of the invention. Once the valid input 3D point locations have been identified, the best set of alignment parameters is found, to match these locations with the locations of corresponding points in the model, i.e., to transform all coordinates to the reference frame of the model, which can be computed using the same methods for aligning multiple set of points described in Horn (supra). The original, uncleaned points can be described as a vector X, $$X=\{x_1, x_2 \ldots x_n, y_1, y_2 \ldots y_n, z_1, z_2, \ldots z_n\},$$

where $(x_i, y_i, z_i)$ are the 3D coordinates of the point with index i.

The points when aligned to the reference frame of the model are described as a vector X' where X' is the result of applying the computed alignment transformation, T, to X, $$X'=T(X),$$

where T is the matrix of computed transformation parameters.

The model is some function, F, which generates a vector of parameters, b, given a set of input point coordinates $$b=F(X')$$

In one set of embodiments, where the model consists of an 'average' shape for the 3D data along with a set of mathematical functions which describe how the shapes can change, b is calculated using:

$$b=A(X'-X'_m)$$

where $X_m$ is the vector of 3D point coordinates for the 'average' shape and A is a matrix learned during the training phase using, for example, Principal Components Analysis, as described in 'Principal Component Analysis' as described by Johnson and Wichern, in *Applied Multivariate Statistical Analysis*, pp. 458-513 (5$^{th}$ Edition, 2002) which is incorporated herein by reference.

To estimate a set of point coordinates given a set of model parameters the 'inverse', (which, in most cases, can only be an approximate inverse) of F, F' is used $$X_e'=F'(b)$$

Where $X_e$ is the estimated value of the 3D coordinates for a given set of parameters, b. If the model is built using Principal Components Analysis then this is written as:

$$X_e=X_m+A'(b)$$

Where A' is the pseudoinverse of A which in the case of Principal Component Analysis is identical to the transpose of A.

Since the number of valid points is less or equal to the number of model points, any missing model points are now generated according to a minimizing algorithm whereby the best set of model parameters, b, is computed such as to achieve the smallest 'distance' between the known valid points and the corresponding points in the model. 'Distance', as discussed above, is used in a general sense that may be Euclidean distance, or other norm or robust metric.

Various model-fitting algorithms may be used to accomplish the foregoing step. One simple method of doing so is the method of weighted least squares, whereby the model parameters are estimated by lowering the weighting of the points known to be missing as described for example in Cootes et al., "The use of Active Shape Models for Locating Structures in Medical Images", *Image and Vision Computing*, vol 12, pp. 355-66 (July 1994), which is incorporated herein by reference.

The result of the foregoing model-fitting process is a 'trial' set of model parameters. These model parameters are then fed into the model so that a complete set of predicted points may be generated for the entire point set.

While a one-shot algorithm, such as weighted least squares fitting, may be applied to derive the predicted point set, in preferred embodiments of the invention, an iterative procedure is employed as now described. A simple, unweighted least squares estimate of the model values is computed:

$$b=A(X'-X_m')$$

These values are used predict the values of the entire 3D point vector in the model frame of reference according to:

$$X_e'=F'(b)$$

T', the inverse of the transformation matrix T, is used to estimate the entire 3D point vector in the original frame of reference:

$$X_e=T'(X_e').$$

Where points are known to be valid, the elements of $X_e$ which are predicted values of the foregoing step are replaced with the known valid points values. This subsequent set of points is now realigned with the model frame of reference and the process that has been described is repeated, A best set of alignment parameters is found and then the fitting algorithm is applied to derive a best set of model parameters. The best set of model parameters is then used to generate another set of predicted points.

This iterative process is repeated until there is convergence (within a specified criterion) or else until a specified maximum number of iterations has been executed. When the iterations have finished, the output of the final step is a full set of 3D points, made up of the actual coordinates of the known valid points, and predicted coordinates of the missing data.

The described embodiments of the invention are intended to be merely exemplary and numerous variations and modifications will be apparent to those skilled in the art. All such variations and modifications are intended to be within the scope of the present invention as defined in the appended claims.

We claim:

1. A method for cleaning a set of motion capture data stored as at least one image on a digital computer, the motion capture data pertaining to an object of a specified class and the data further corresponding to a set of point coordinates relating to a model characterized by a set of model parameters, the method comprising:

a. identifying a subset of the motion capture data of each single frame in turn corresponding to valid points matching locations of corresponding points of the model, based exclusively upon distances of neighboring points in motion capture data pertaining to the single frame;

b. computing a best set of model parameters to minimize a norm of the valid points with respect to the model; and c. predicting a complete set of predicted point coordinates based on the best set of model parameters so as to form a subsequent set of cleaned motion capture data.

2. The method according to claim 1, further comprising a step of replacing a subset of the predicted point coordinates with known valid values.

3. The method according to claim 2, further comprising using the subsequent set of cleaned motion data according to step (c) as the subset of motion capture data of step (a), and iterating steps (a), (b), and (c) until a specified criterion is met.

4. The method according to claim 3, wherein the criterion is a bound on a norm characterizing the difference between the subsequent set of cleaned motion data according to step (c) and the subset of motion capture data of step (a).

5. The method according to claim 3, wherein the criterion is a specified number of iterations.

6. The method according to claim 1, further comprising creating the model from a training set of plausible shapes and shape variations of the class of the object.

7. A method according to any of claims 1 to 6, wherein the model parameters comprise an orthonormal basis set spanning a space of model vectors.

8. A method according to any of claims 1 to 6, wherein the model comprises an average shape of a subject and a set of functions describing deviations from the average shape characterized by the model parameters.

9. A program storage device readable by a machine, tangibly embodying a program of instructions executable by the machine to perform a method for cleaning a set of motion capture data, the data corresponding to a set of point coordinates relating to a model characterized by a set of model parameters, the method comprising:
   a. identifying a subset of the motion capture data of each single frame in turn corresponding to valid points matching locations of corresponding points of the model, based exclusively upon distances of neighboring points in motion capture data pertaining to the single frame;
   b. computing a best set of model parameters to minimize a norm of the valid points with respect to the model; and
   c. predicting a complete set of predicted point coordinates based on the best set of model parameters so as to form a subsequent set of cleaned motion capture data.

10. The program storage device of claim 9, wherein the method performed by the set of machine instructions further comprises a step of iterating steps (a) through (c).

11. A system for cleaning a set of motion capture data, the data corresponding to a set of point coordinates relating to a model characterized by a set of model parameters, the system comprising:
   a. means for identifying a subset of the motion capture data of each single frame in turn corresponding to valid points matching locations of corresponding points of the model based exclusively upon distances of neighboring points in motion capture data pertaining to the single frame;
   b. means for computing a best set of model parameters to minimize a norm of the valid points with respect to the model; and
   c. means for predicting a complete set of predicted point coordinates based on the best set of model parameters so as to form a subsequent set of cleaned motion capture data.

* * * * *